June 18, 1957 P. A. CHOMBARD 2,796,594
APPARATUS FOR FACILITATING THE PILOTING OF AIRCRAFT
Filed Sept. 6, 1955 3 Sheets-Sheet 1

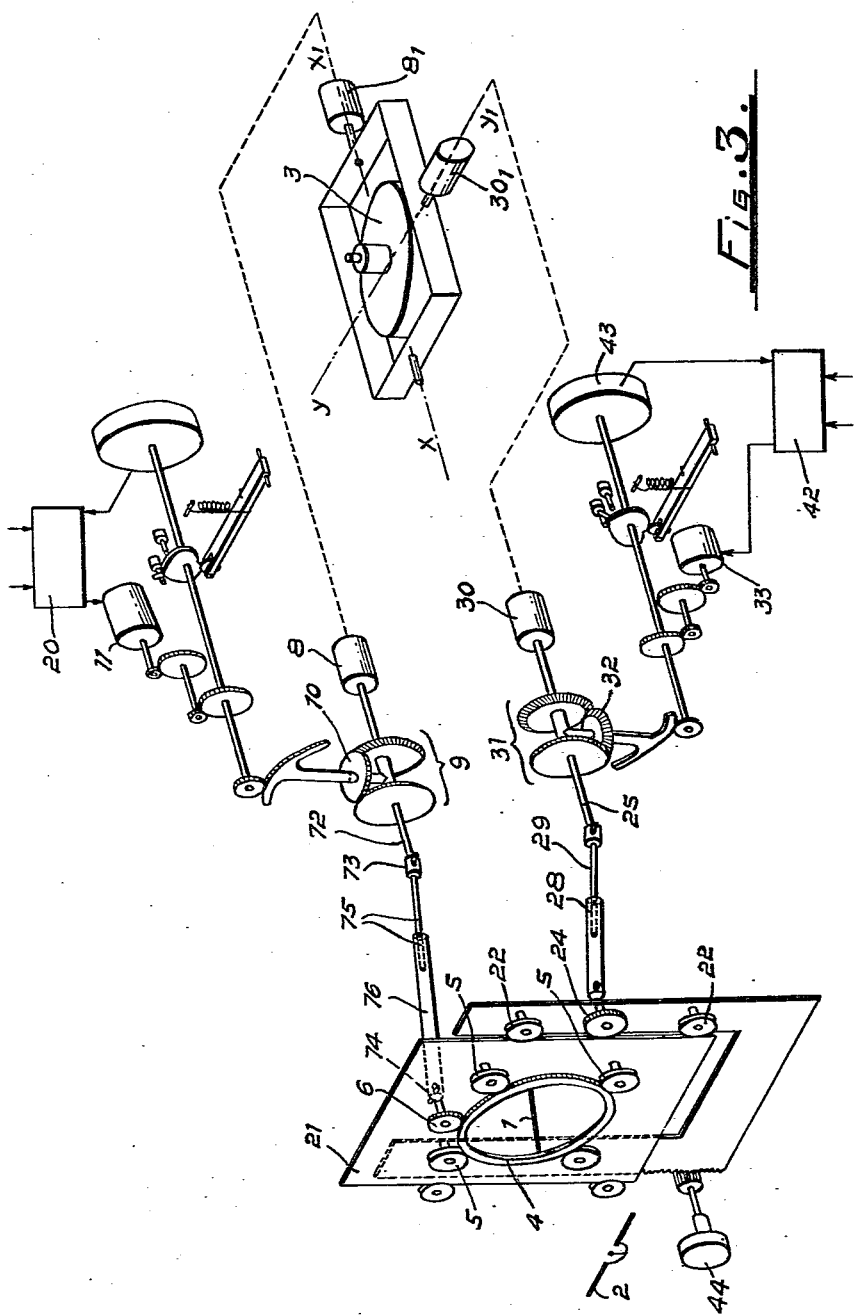

United States Patent Office 2,796,594
Patented June 18, 1957

2,796,594

APPARATUS FOR FACILITATING THE PILOTING OF AIRCRAFT

Pierre André Chombard, Boulogne-sur-Seine, France, assignor to Etat Français, represented by Monsieur l'Ingenieur, General Mazor, acting on behalf of the Secretary of State for Defence and Armed Forces, Paris, France Application September 6, 1955, Serial No. 532,395

Claims priority, application France December 29, 1954

8 Claims. (Cl. 340—27)

The constantly increasing number of piloting and navigating instruments complicates more and more the work of the pilot who is compelled to make a synthesis of their dispersed indications with a view to exerting on the aircraft controls the action suitable for the movements he intends to carry out. Further, whereas each instrument, considered separately, is designed for facilitating an intuitive interpretation of its indications, there are observed, between the various instruments, particularly piloting instruments proper and the instruments used in radio-navigation, discrepancies which make it difficult to acquire the desirable reflexes. Thus, for example, a deviation of the aircraft towards the left causes a movement towards the left of the pointer in the turn indicator and a movement towards the right of the pointer in the poor visibility landing indicator (instrument landing system).

Patent No. 2,696,597 describes an apparatus for facilitating the piloting of aircraft, the object thereof being to synthetize on the dial of the gyroscopic horizon the indications given by the other instruments which the pilot should normally refer to for carrying out a movement, so that the said movement is effected by piloting the craft according to the indications, interpreted in the usual manner, given by the gyroscopic horizon, modified as mentioned in the said patent, and which is called a synthetizer.

This synthetizer comprises a gyroscopic horizon the dial thereof being provided with a horizon bar associated with the position of the true horizontal plane and with a vignette, visualizing the span of the aircraft, made integral with the aircraft, this vignette being moreover adapted to be vertically displaced or turned around its centre by means of suitable apparatus related to references defining the trajectory of the aircraft, so that the pilot only has to maintain in coincidence the vignette and the horizon bar to cause the aircraft to move along the trajectory determined by the said references.

In this apparatus, there has only been contemplated the displacement, on one and the same dial, of a marking independent of the position of the true horizontal plane, i. e. the vignette, with regard to another marking, i. e. the horizon bar, related to this true horizontal plane.

It is obvious that the synthetizer thus defined can be used, without falling outside the scope of this patent, to displace under the same conditions the horizon bar if this bar is made integral with the aircraft and if the vignette is associated with the true horizontal plane in the gyroscopic horizon.

The same will hold good if the pitching and rolling movements are indicated on two different dials, the synthetizer being utilised in this case to displace, on each dial, the marking related to the aircraft with regard to the marking related to the true horizontal plane.

The object of the present invention is a synthetizer which is able, to displace according to indications of suitable apparatus not only markings of the gyroscopic horizon related to the aircraft, as in the above cited patent, but also markings of the gyroscopic horizon related to the true horizontal plane or, in fact, to the vertical-indicating gyroscope. Here again, the pilot only has to constantly bring the markings into coincidence to cause the aircraft to follow the trajectory determined by the above mentioned suitable apparatus.

Other objects and advantages of the invention will appear as it is described in connection with the accompanying drawings.

In the drawings:

Figure 3 is a diagram of another form of embodiment of the synthetizer applied to a gyroscopic horizon in which the pitching and the rolling are given by the divergences of a single marking, viz: a horizon bar, this single marking being moreover displaced by suitable apparatus the references of which are related to the trajectory.

Figure 1:
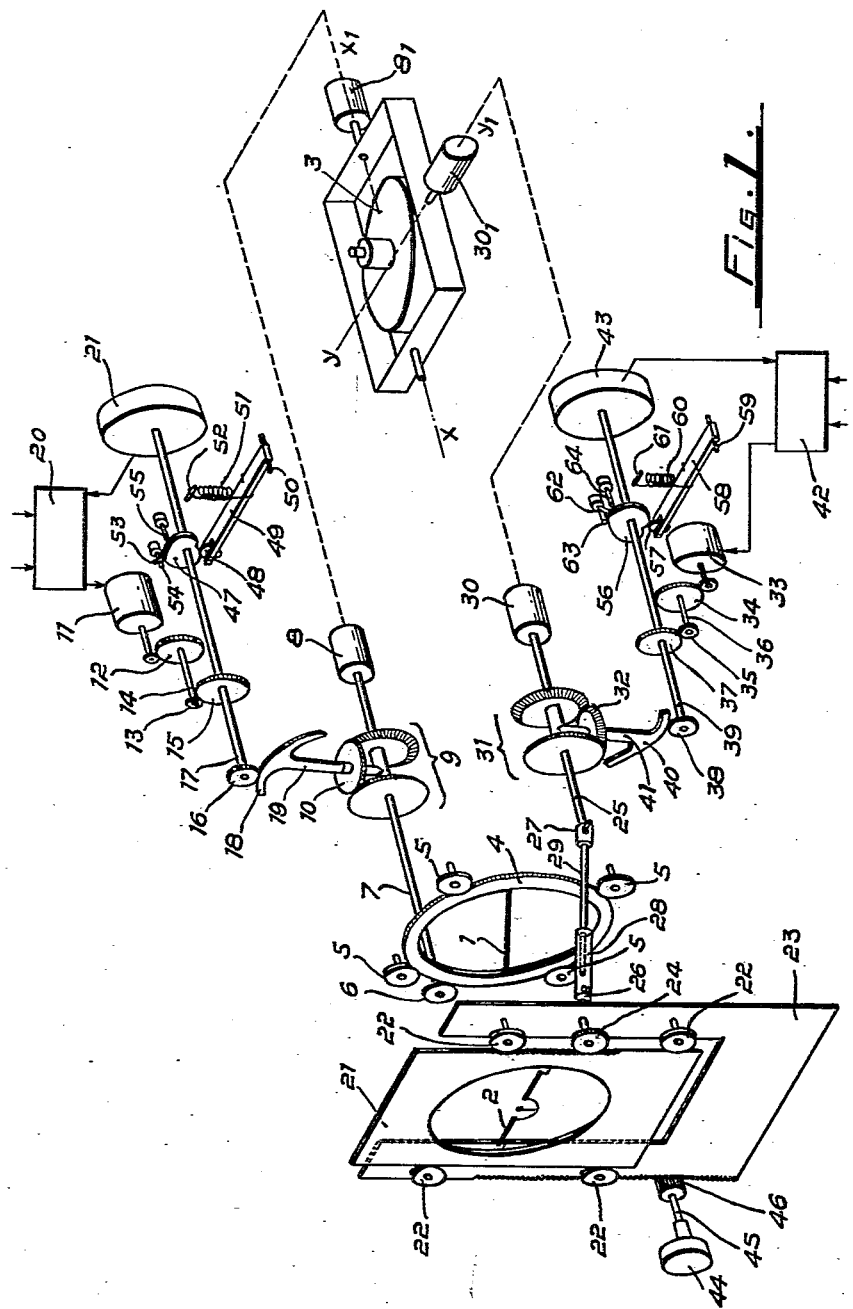
Figure 1 is a diagram of a form of embodiment of the synthetizer applied to a gyroscopic horizon in which the pitching and the rolling are given by the divergences of two markings, viz: a horizon bar and a vignette, each of these two markings being moreover displaced by suitable apparatus the references of which are related to the trajectory.

In Figure 1, the horizon bar 1 is related to the displacements of the gyroscope 3 about the axis $XX_1$, parallel to the plane of longitudinal symmetry of the craft, and the vignette 2 is related to the displacements of said gyroscope about the axis $YY_1$, perpendicular to the said plane of longitudinal symmetry.

The two markings, horizon bar 1 and vignette 2, are represented in Figure 1 spaced from one another for the sake of clearness. In fact, they appear on the same dial.

The horizon bar 1 is integral with the ring 4, which can rotate between rollers 5 the spindles of which are fixed with respect to the housing of the apparatus. This ring 4 is toothed on its outer periphery and meshes with a pinion 6, secured to one end of a rod 7, a member 8 being secured at the other end of said rod. The said member 8 is electrically connected with the member $8_1$ secured to the spindle $XX_1$ of the gyroscope 3, these two electrically connected members 8 and $8_1$ constituting respectively the receiving and transmitting apparatus of an electric transmission of a known type (autosynchronous, potentiometric, etc.) of the movement of the spindle $XX_1$ to the rod 7.

On this rod 7 is mounted a mechanical differential 9, the planet-wheel 10 of which is driven by the motor 11 through a gear-train constituted in the particular case of the present embodiment, by pinions 12 and 13 keyed to a common spindle 14, by pinions 15 and 16 keyed to a common spindle 17, the pinion 15 meshing with pinion 13 and the pinion 16 meshing with the toothed sector 18 carried by the radius 19 on which is keyed the planet-wheel 10.

The motor 11 is fed by the mixer and amplifier 20 receiving at its input, on the one hand, signals or impulses from different control instruments for the direction of the craft and, on the other hand, in opposition to the said signals or impulses, the feed-back coming from the pick-up 21 transforming into electric signals the displacements of the spindle 17 on which it is keyed. The position of the horizon bar 1 is thus made dependent on the signals or impulses entering the mixer and amplifier 20.

The vignette 2 is secured in an opening in the substantially vertical plate 21. The latter is guided between rollers 22 the spindles of which are secured to the plate 23, and moves in height under the action of the pinion 24 meshing with a toothed edge of the said plate 21. The pinion 24 is keyed to the broken rod 25 provided with two Cardan joints 26 and 27 between which the two parts 28 and 29 can slide one within the other. The portion of the broken rod 25 which is keyed to pinion 24 is journalled in the plate 23. The broken rod 25 leads at its other end to the member 30, electrically connected with the member $30_1$ keyed to the spindle $YY_1$ of the gyroscope 3, these two electrically connected members 30 and $30_1$ constituting, as the above members 8 and $8_1$, an electric transmission of a known type (autosynchronous, potentiometric, etc.) of the movement of rotation of the spindle $YY_1$ to the broken rod 25.

On this broken rod 25 is mounted a differential 31 the planet-wheel 32 of which is driven by the motor 33 by means of a gear-train constituted in the particular case of the present embodiment, by pinions 34 and 35 keyed to a common spindle 36, by pinions 37 and 38 keyed to a common spindle 39, the pinion 35 meshing with the pinion 37 and the pinion 38 meshing with the toothed sector 40 carried by the radius 41 on which is keyed the planet-wheel 32.

The motor 33 is fed, as the above motor 11, by the mixer and amplifier 42 which receives at its input, on the one hand, signals or impulses from different control instruments for the height of the aircraft and, on the other hand, in opposition to said signals or impulses, the feed-back coming from the pick-up 43 transforming into electric signals the displacements of the spindle 39 on which it is keyed. The position of the vignette 2 is thus made dependent on the signals or impulses entering the mixer and amplifier 42.

The plate 23 can be displaced in height by the pilot by means of the knob 44 keyed to one of the ends of the rod 45, a pinion 46, keyed to the other end of the said rod, meshing with teeth carried by one of the lateral edges of the said plate 23.

Means for automatically cutting out the displacements of the horizon bar 1 caused by the suitable apparatus so as to only retain those resulting from the vertical-indicating gyroscope in the case of stoppage of the motor 11 are constituted by a heart-shaped cam 47 keyed to the spindle 17, in contact with a roller 48 mounted on the end of the lever 49 pivoting about the fixed spindle 50. Moreover, a spring 51 mounted between the said lever 49 and a fixed part 52 of the craft constantly urges the roller 48 on the edge of the heart-shaped cam 47, so that the latter, when the motor 11 is no longer energized, rotates until the roller 48 comes into the re-entrant portion of the edge of the said cam.

A finger 53, the movement of which is limited between two stops 54 and 55 integral with the craft, is secured to the heart-shaped cam 47, but could equally well be directly secured to the spindle 17. These two stops, the relative position of which is adjustable, constitute with the finger 53 a device for limiting the amplitude of the additional rotation of the horizon bar 1 according to the maximum evolutions forseen for the aircraft.

The means for automatically cutting out the additional displacements of the vignette 2 caused by the suitable apparatus so as to only retain those resulting from the vertical-indicating gyroscope, in the case where the motor 33 is no longer energized, and a device for limiting the amplitude of the additional displacement in height of the vignette 2 according to the maximum evolutions foreseen for the aircraft, said means and the said device being similar to the previously described means, are constituted by the heart-shaped cam 56 secured to the spindle 39, the roller 57, the lever 58 pivoting about the fixed spindle 59, the spring 60 secured to the craft at 61 and urging the roller 57 against the peripheral edge of the heart-shaped cam 56. The latter, or the spindle 39, also carries, a finger 62, the movement of which is limited between two adjustable stops 63 and 64 integral with the craft.

The operation of this apparatus is as follows:

The relative angular displacement of the gyroscope 3 about the spindle $XX_1$ displays at each moment to the pilot the angle of roll of the aircraft.

By means of the members 8 and $8_1$ of the electric transmission, the rotation about the spindle $XX_1$ is reproduced about the spindle 7. The tilting of the horizon bar 1, controlled by the pinion 6, displays to the pilot the angle of roll provided the number of teeth of the pinion 6 and of the ring 4, or the transmission ratio of the gear-train which is contingently substituted therefor is adapted in consequence.

This corresponds to the normal use of the gyroscopic horizon alone. Through the instrumentality of the differentials 9 and 31 the displacements corresponding to the signals or impulses from the suitable apparatus are added to the previous displacements, so that the pilot by maintaining the coincidence between the vignette and the horizon bar, the aircraft follows the trajectory determined by the references of said suitable apparatus.

In the same way, the position in height of the vignette 2 displays at each moment to the pilot an indication on the pitching. Moreover, with the knob 44, the pilot can manually displace in height the vignette 2.

Figure 2:
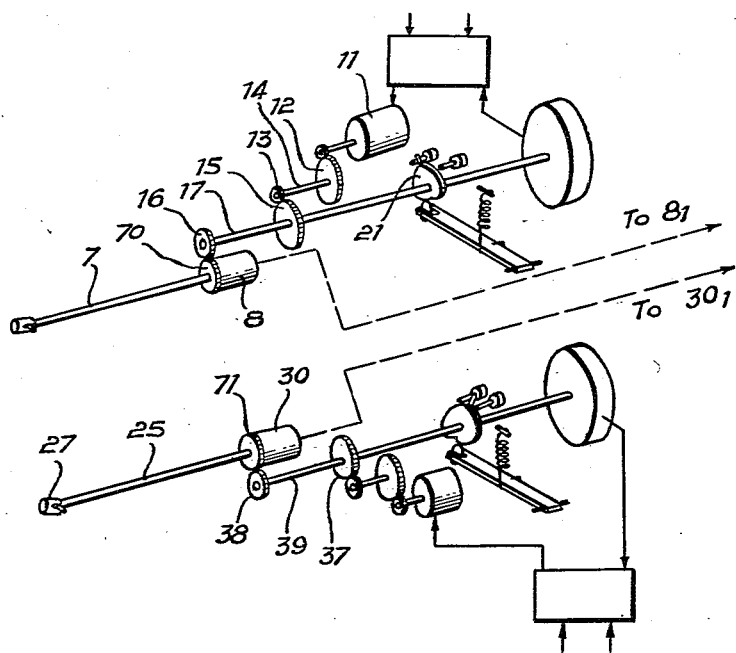
Figure 2 is a diagram of an electric differential which can be substituted for the mechanical differential in the embodiment of Figure 1.

In an alternative embodiment, the mechanical differentials 9 and 31 are omitted and electric differentials substituted therefor. The pinion 16, keyed to the spindle 17, see Fig. 2, meshes directly with external teeth 70 carried by the stator of the electric receiving apparatus 8, the rotor of which is keyed to the rod 7. In the same way, the pinion 38, keyed to the spindle 39, meshes directly with external teeth 71 carried by the stator of the receiving apparatus 30, the rotor of which is keyed to the rod 25. Electric differentials of another type can be used.

In the embodiment illustrated on Fig. 3, the horizon bar 1 is related to the relative displacements of the gyroscope 3 about the two spindles $XX_1$, $YY_1$, while the vignette 2 is integral with the craft. It is this movable horizon bar 1 which is additionally displaced in height and rotated about its centre by the suitable apparatus according to the references defining the course of the craft.

The differences between the above described embodiment illustrated in Figure 1 and the embodiment illustrated in Figure 3 are as follows:

The ring 4 moves in height with the plate 21 since it is maintained between the rollers 5, the spindles of which are secured to this plate 21.

The spindle 72 on which are keyed the differential 9 and the member 8 is a broken spindle having two cardan joints 73 and 74 between which the parts 75 and 76 are adapted to slide the one within the other. The part 76 on one end carries the pinion 6 meshing with teeth of the ring 4.

The mechanical differentials can also be replaced by electric differentials, as mentioned above and as illustrated in Figure 2.

It is to be understood that the above embodiments have been described and illustrated here only by way of indication and in no wise in a limitative manner, and that other devices giving similar results may be adopted within the scope of the invention.

Finally, the apparatus is completed by a transverse level indicator of a known type, for instance of the type consisting of a ball moving inside a curved glass tube filled with a damping liquid (not shown on the drawings).

The operation of, and the part played by the synthetizer will appear from the hereinafter described main uses thereof given by way of non-limitative examples.

It is pointed out once for all, that the possible side-slip shown by the transverse level indicator is cancelled by a suitable action of the pilot on the rudder and aileron controls.

Finally, it should be understood that the elevation and transverse piloting operations, hereinafter described separately for facilitating their understanding, may be combined in various ways.

1. ELEVATION PILOTING

(a) *Level flight by the use of an altimetric reference*

An altimetric reference of any type supplies electric signals which measure the variations in pressure or altitude about the value set up. These signals are used for vertically displacing the marking moveable in height, (vignette 2 in the case of Figure 1, horizon bar 1 in the case of Figure 3) by an amount dependent on these signals. The latter are received in the mixer and amplifier 42 and are transferred to the motor 33 the shaft of which rotates by corresponding angle. This rotation is transmitted to the corresponding marking by the interposed gears, the mechanical differential 31 or the stator of the receiving apparatus 30 in the case of the electric differential, and the pinion 24 meshing with one of the vertical edges of the plate 21. The pilot only has to maintain at all times the marking so displaced in height under the same conditions as if it were the marking of a normal gyroscopic horizon; in order to maintain his altitude, with aperiodic returns in the case of accidental variations. The pilot may also, in a similar manner, set up another altitude to which the synthetizer piloting will automatically bring him, with an aperiodic termination of the vertical displacement. The upward or downward flight will be effected with the limiting pitching inclination chosen, taking into account the maximum evolution foreseen for the aircraft which are materialized by the distance between the two adjustable stops 63 and 64, which determine the maximum rotation of the spindle 25.

(b) *Upward or downward flight at a definite vertical speed*

If a variometric reference is available to the pilot, translating into electric signals the differences between the vertical speed of the aircraft and the vertical speed set up, after having manually adjusted the position of the marking movable in height according to the desired rate of climbing or diving, he will only have to connect the variometric reference with the mixer and amplifier 42; the said marking movable in height will thus move vertically according to the variations of the instantaneous vertical speed with regard to the chosen vertical speed. Piloting is carried out as in the previous case, that is to say, as if the said marking were that of a gyroscopic horizon of a normal type.

(c) *Flight along the downward trajectory of a radio-electric device for poor visibility landing (known as "instrument landing system")*

The variation signals given by the aircraft receiver of the instrument landing system are received, as in the preceding cases, in the mixer and amplifier 42. Clutching in is effected at the moment when the aircraft flying level intersects the downward trajectory. The trajectory will be followed all the more faithfully if the pilot offsets in the proper direction the marking movable in height, by the value corresponding to the slope of the downward trajectory.

(d) *General case*

Any pitching movement which can be translated into electric signals may be indicated in a similar manner to the pilot who, in all cases, just maintains the markings of the gyroscopic horizon in the same position as if the latter were of a conventional type. This causes him to automatically carry out the desired control with aperiodic motions of the aircraft. Such operations may, for instance, be ordered to him from the ground, through a remote control device or through a guiding device carried by the aircraft so as to orient it either towards a movable target or towards a fixed point on the ground.

2. TRANSVERSE PILOTING

(a) *Flight along a predetermined course*

The method which consists of setting the course to be kept on a course indicating instrument to derive therefrom electrical signals which are proportional, within a certain range, to the variations with respect to said course, is known. These signals are introduced into the mixer and amplifier 20 and cause, by means of the motor 11 of the mechanical differential 9, or of the stator of the receiving apparatus 8, the interposed gears and the pinion 6, the rotation of the horizon bar 1 connected to the ring 4 which is adapted to rotate. If the pilot continues to maintain the markings of the gyroscopic horizon in the same position as if the latter were of a conventional type, the aircraft will bank at angles which are dependent within definite limits on the deviation from the course, which will produce an aperiodic return to the course to be held.

Beyond the above limits, the aircraft remains banked at the limiting value determined by the distance between the two adjustable stops 54 and 55, which take into account the maximum evolutions forseen for the aircraft, limiting the possible angular movement of the spindle 17, and hence that of the horizon bar 1.

(b) *Flight along an axis defined by a radio-electric process*

This consists, in fact, in following the directional beam of an instrument landing system or the axis of an alignment radio-beacon.

The course for the axis to be followed being set on the above mentioned course indicating instrument, the signals supplied by this indicator are added algebraically with those given by the radio-electric reference for displacing, in a roll motion, in the suitable direction, the horizon bar 1 of the synthetizer, in such a manner that the pilot following the indications thereof, is aligned by an aperiodic motion, on the desired axis. In case of a cross-wind, the aircraft does not stabilize exactly on the desired trajectory, which is shown by the fact that the course held, after damping, is different from the set course. It is sufficient, then, to modify the set course by an amount equal to the drift thus shown, in a suitable direction, to obtain the desired result to a very sufficient approximation.

It is also possible by integrating the received signals to do away with the setting of the course to be held and to automatically compensate the effect of the transverse wind.

(c) *General case*

Any change in course which can be translated into electric signals may be indicated in a similar manner to the pilot, who, in all cases, will only have to maintain the markings of the gyroscopic horizon in the same position as if the latter were of a conventional type, and this automatically causes the aircraft to carry out the desired movement with aperiodic motions.

Such movements may, for instance, be ordered to him from the ground, through a remote control device, or through a guiding device carried by the aircraft, so as to orient it either towards a movable target or towards a fixed point on the ground.

It will be obvious, further, that the invention has been described and illustrated here only by way of indication, and in nowise in a limitative manner and that any useful modifications may be made thereto within its scope.

I claim:

1. Apparatus for facilitating the piloting of aircraft comprising a gyroscopic horizon of any known type having a vertical-indicating gyroscope, a marking movable in pitching and means for transmitting the pitching movements from the said gyroscope to the said marking, a marking movable in rolling and means for transmitting the rolling movements from the said gyroscope to the said marking, and at least one marking fixed with regard to the aircraft, means for adding to the said displacements of the movable markings additional displacements, these means being actuated by suitable apparatus, means for cancelling the said additional displacements of the movable markings, in the case of a failure of the means which cause them, means for limiting the amplitude of the said additional displacements according to the maximum evolutions foreseen for the aircraft, a manual control for displacing the pitching marking, in the direction in which it displaces itself for showing the variations of pitching, so that the pilot only has to maintain the coincidence between the same markings of the gyroscopic horizon as if the means for adding to the markings movable under the action of the vertical-indicating gyroscope additional displacements by suitable apparatus did not exist, in order that the aircraft may move along a trajectory determined by the indications of the said apparatus.

2. Apparatus for facilitating the piloting of aircraft, according to claim 1 wherein said movable marking comprises a movable vignette indicating the pitching movements, said pitching movements transmitting means comprises a substantially vertical plate with teeth on one of its lateral edges and a round opening in which is fixed the said vignette, a supporting-frame for said plate, lateral guiding rollers for the plate having spindles secured to the said supporting-frame, a pinion meshing with said teeth on the edge of the said plate, a broken control rod having two parts with one end of one of said parts keyed to the said pinion and borne by the said supporting-frame, two cardan joints between which said two parts slide the one within the other and one end of the other part keyed to the receiving apparatus of the electric transmission of the oscillations in pitching of the vertical-indicating gyroscope, said movable in rolling marking comprises a movable horizon bar indicating the movements in rolling, said rolling movements transmitting means comprises a circular ring with teeth on a part of its outer edge, the said horizon bar being fixed in the said ring, supporting rollers for this ring the spindles of which are secured on the housing of the apparatus, a pinion meshing with the teeth of the said ring, a control rod with an end keyed to the said pinion and its other end keyed to the receiving apparatus of the electric transmission of the oscillations in rolling of the vertical-indicating gyroscope, said additional displacement means comprises a first mechanical differential mounted on the said control rod between the said receiving apparatus and the said pinion, a toothed sector, the central portion of which constitutes the spindle of a planet-wheel of the said differential and, keyed to this planet-wheel, a first gear-train, one of the end pinions of this gear-train meshing with the said toothed sector, an electric motor the shaft of which meshes with the other end pinion of the said gear-train, a mixer and amplifier receiving the impulses from suitable apparatus, a pick-up keyed to the spindle of the first of the two end pinions of the said gear-train, a second mechanical differential mounted on the portion of the broken control rod of the vignette between the receiving apparatus of the electric transmission and the nearest cardan joint, a toothed sector, the central portion of which constitutes the spindle of a planet-wheel of the said differential and, keyed to this planet-wheel, a second gear-train, one of the two end pinions of this gear-train meshing with the said toothed sector, an electric motor the shaft of which meshes with the other end pinion of the said gear-train, a mixer and amplifier receiving the impulses from suitable apparatus, a pick-up keyed to the spindle of the first of the two end pinions of the said second gear-train.

3. Apparatus for facilitating the piloting of aircraft according to claim 2, in which the means for cancelling the additional rotation of the horizon bar about its centre, in the case of a failure of the means which cause the said rotation, are constituted by a heart-shaped cam keyed to the spindle of the end pinion of the gear-train meshing with the shaft of the motor, this end pinion being on the side opposed to the motor, a roller in contact with the edge of the said heart-shaped cam, a lever with one of its ends pivoting on a spindle fixed with regard to the aircraft, its other end carrying the said roller, and a spring between the said lever and a point fixed with regard to the aircraft, and in which the means for cancelling the additional displacements in height of the vignette, in the case of a failure of the means which cause them, are constituted by a heart-shaped cam keyed to the spindle of the end pinion of the gear-train meshing with the shaft of the motor, this end pinion being on the side opposed to the motor, a roller in contact with the edge of the said heart-shaped cam, a lever with one of its ends pivoting on a spindle fixed with regard to the aircraft, its other end carrying the said roller, and a spring between the said lever and a point fixed with regard to the aircraft.

4. Apparatus for facilitating the piloting of aircraft according to claim 2, in which the means for limiting, according to the maximum evolutions foreseen for the aircraft, the additional rotation of the horizon bar about its centre and the additional displacement in height of the vignette are respectively constituted by a finger integral with the spindle of the end pinion of the gear-train meshing with the shaft of the motor, this end pinion being located in the direction of the control rod of the corresponding movable marking, and two stops fixed with regard to the aircraft, the relative position of these stops being adjustable and the possible displacement of the said finger, and therefore the amplitude of the additional displacement of the corresponding movable marking being limited by these stops.

5. Apparatus for facilitating the piloting of aircraft according to claim 2, in which the manual control of the displacement in height of the vignette is constituted by a rod with a knob keyed to one of the ends of the said rod and a pinion keyed to its other end, teeth on one of the lateral edges of the supporting-frame, the said pinion meshing with the said teeth.

6. Apparatus for facilitating the piloting of aircraft comprising a gyroscopic horizon having a vertical-indicating gyroscope, a vignette fixed with regard to the aircraft, a movable horizon bar indicating the pitching and rolling movements, a substantially vertical plate having teeth on one of its lateral edges and a circular opening through which is visible the said horizon bar, a circular ring having teeth on part of its outer edge, the said horizon bar being secured in the said ring and the latter rotating itself in the opening in the above substantially vertical plate, lateral guiding rollers of the said plate and a supporting-frame, the spindles of the said rollers being secured to the said supporting-frame, a pinion meshing with teeth on the edge of the said plate, a broken control rod with one of its end parts keyed to the said pinion and borne by the said supporting-frame, two cardan joints and two parts sliding the one within the other between these cardan joints and its other end part keyed to the receiving apparatus of the electric transmission of the oscillations in pitching of the vertical-indicating gyroscope, a movable horizon bar indicating the movements in rolling, a circular ring with teeth on a part of its outer edge, the said horizon bar being fixed in the said ring, rollers for supporting this ring the spindles of which are secured to the supporting-frame, a pinion meshing with teeth on the said ring, a broken control rod having one of its end portions keyed to the said pinion and carried by the said supporting-frame, two cardan joints and two parts sliding the one within the other between these cardan joints, and having its other end position keyed to the receiving apparatus of the electric transmission of the rolling oscillations of the vertical-indicating gyroscope, a first mechanical differential mounted on this last portion of the broken control rod between the said receiving apparatus and the nearest cardan joint, a toothed sector, the central portion of which constitutes the spindle of a planet-wheel of the said differential and, keyed to this planet-wheel, a first gear-train, one of the end pinions of this gear-train meshing with the said toothed sector, an electric motor the shaft of which meshes with the other end pinion of the said gear-train, a mixer and amplifier receiving the impulses from suitable apparatus, a pick-up keyed to the spindle of the first of the two end pinions of the said gear-train, a second mechanical differential mounted on the portion of the broken control rod of the vignette between the receiving apparatus of the electric transmission and the nearest cardan joint, a toothed sector, the central portion of which constitutes the spindle of a planet-wheel of the said differential and, keyed to this planet-wheel, a second gear-train, one of the two end pinions of this gear-train meshing with the said toothed sector, an electric motor the shaft of which meshes with the other end pinion of the said gear-train, a mixer and amplifier receiving the impulses from suitable apparatus, a pick-up keyed to the spindle of the first of the two end pinions of the said second gear-train, means for cancelling the additional displacements of the horizon bar, in the case of a failure of the means which cause them, means for limiting, according to the desired maximum banking angles of the aircraft, the amplitude of the additional displacement in height of the horizon bar and the amplitude of its additional rotation around its centre, a manual control for displacing the vignette in height, so that the pilot only has to maintain the coincidence between the same markings of the gyroscopic horizon as if the means for adding to the horizon bar movable according to the oscillations of the vertical-indicating gyroscope additional displacements in height and additional rotation about its centre under the action of the suitable apparatus, did not exist, in order that the aircraft may move along a trajectory determined by the indications of the said apparatus.

7. Apparatus for facilitating the piloting of aircraft, according to claim 1 wherein said movable marking comprises a movable vignette indicating the pitching movements, said pitching movements transmitting means comprising a substantially vertical plate with teeth on one of its lateral edges and a round opening in which is fixed the said vignette, a supporting-frame for said plate, lateral guiding rollers for the plate having spindles secured to the said supporting-frame, a pinion meshing with said teeth on the edge of the said plate, a broken control rod having two parts with one end of one of said parts keyed to the said pinion and borne by the said supporting-frame two Cardan joints between which said two parts slide the one within the other and one end of the other part keyed to the receiving apparatus of the electric transmission of the oscillations in pitching of the vertical-indicating gyroscope, said movable in rolling marking comprises a movable horizon bar indicating the movements in rolling, said rolling movement transmitting means comprises a circular ring with teeth on a part of its outer edge, the said horizon bar being fixed in the said ring, supporting rollers for this ring the spindles of which are secured on the housing of the apparatus, a pinion meshing with the teeth of the said ring, a control rod with an end keyed to the said pinion and its other end keyed to the receiving apparatus for the electric transmission of the oscillations in rolling of the vertical-indicating gyroscope, said additional displacement means comprises on the one hand the stator of the electrical receiver depending upon the oscillations in pitching of the vertical-indicating gyroscope and fixed at the other end of the control rod, has a toothing on its periphery, said toothing meshing with the terminal pinion of the gearing which transmits the movement from the corresponding motor and on the other hand the stator of the electrical receiver depending upon the oscillations in rolling of the vertical-indicating gyroscope and fixed at the end of the control rod, has a toothing on its periphery, said toothing meshing with the terminal pinion of the gearing which transmits the movement from the corresponding motor.

8. Apparatus for facilitating the piloting of aircraft comprising a gyroscopic horizon having a vertical-indicating gyroscope, a vignette fixed with regard to the aircraft, a movable horizon bar indicating the pitching and rolling movements, a substantially vertical plate having teeth on one of its lateral edges and a circular opening through which is visible the said horizon bar, a circular ring having teeth on part of its outer edge, the said horizon bar being secured in the said ring and the latter rotating itself in the opening in the above substantially vertical plate, lateral guiding rollers of the said plate and a supporting-frame, the spindles of the said rollers being secured to the said supporting-frame, a pinion meshing with teeth on the edge of the said plate, a broken control rod with one of its end parts keyed to the said pinion and borne by the said supporting-frame, two Cardan joints and two parts sliding the one within the other between these Cardan joints and its other end part keyed to the receiving apparatus of the electric transmission of the oscillations in pitching of the vertical-indicating gyroscope, a movable horizon bar indicating the movements in rolling, a circular ring with teeth on a part of its outer edge, the said horizon bar being fixed in the said ring, rollers for supporting this ring the spindles of which are secured to the supporting-frame, a pinion meshing with teeth on the said ring, a broken control rod having one of its end portions keyed to the said pinion and carried by the said supporting-frame, two Cardan joints and two parts sliding the one within the other between these Cardan joints, and having its other end portion keyed to the receiving apparatus of the electric transmission of the rolling oscillations of the vertical-indicating gyroscope, and an electric differential constituted by teeth on the outer surface of the stator of the electric receiving apparatus associated with the oscillations of the vertical-indicating gyroscope, the end pinion of the gear-train actuated by the corresponding motor being directly in mesh with the said teeth.

References Cited in the file of this patent

UNITED STATES PATENTS

| | | |
|---|---|---|
| 2,424,570 | Jenks | July 29, 1947 |
| 2,696,597 | Chombard | Dec. 7, 1954 |
| 2,737,640 | Barnaby | Mar. 6, 1956 |